United States Patent
Oh et al.

(10) Patent No.: US 11,473,169 B2
(45) Date of Patent: Oct. 18, 2022

(54) METAL RECOVERY METHOD USING ADSORBENT

(71) Applicant: DANAM-ENE CO. LTD., Paju (KR)

(72) Inventors: Young Min Oh, Goyang (KR); Young Joo Jang, Gongju (KR); Moo Ki Bae, Daejeon (KR)

(73) Assignee: DANAM-ENE CO. LTD., Paju (KR)

( * ) Notice: Subject to any disclaimer, the term of this patent is extended or adjusted under 35 U.S.C. 154(b) by 415 days.

(21) Appl. No.: 16/639,470

(22) PCT Filed: Nov. 27, 2018

(86) PCT No.: PCT/KR2018/014677
§ 371 (c)(1),
(2) Date: Feb. 14, 2020

(87) PCT Pub. No.: WO2020/111288
PCT Pub. Date: Jun. 4, 2020

(65) Prior Publication Data
US 2021/0130925 A1 May 6, 2021

(30) Foreign Application Priority Data

Nov. 26, 2018 (KR) .................. 10-2018-0147501

(51) Int. Cl.
*C22B 15/00* (2006.01)
*B04C 9/00* (2006.01)
(Continued)

(52) U.S. Cl.
CPC ............ *C22B 15/0086* (2013.01); *B04C 9/00* (2013.01); *C02F 1/281* (2013.01); *C22B 3/24* (2013.01); *C22B 7/006* (2013.01); *C22B 11/042* (2013.01); *C22B 11/046* (2013.01); *C22B 11/08* (2013.01); *C22B 15/0065* (2013.01);
(Continued)

(58) Field of Classification Search
CPC ....... C22B 15/0086; C22B 3/24; C22B 7/006; C22B 11/042; C22B 11/046; C22B 11/08; C22B 15/0065; C22B 15/0076; C22B 15/0084; B04C 9/00; B04C 2009/002; C02F 1/281; C02F 1/004; C02F 1/38; C02F 1/52; C02F 1/76; C02F 9/00;
(Continued)

(56) References Cited

U.S. PATENT DOCUMENTS 5,411,575 A * 5/1995 Fleming .................... C25C 1/12
75/743
2004/0213715 A1* 10/2004 Lucien .................... C22B 11/08
423/40
2017/0304803 A1 10/2017 Meyer et al.

FOREIGN PATENT DOCUMENTS

CN 108529722 A 9/2018
JP A09-511023 A 11/1997
(Continued)

*Primary Examiner* — Fred Prince

(57) ABSTRACT

The present invention relates to a method for recovering metals using an adsorbent, which comprises preparing a leachate comprising metal ions and cyanides, wherein the metal ions comprise gold ions and copper ions; and in a state where the leachate has a cyanide (CN) concentration of 0.1 ppm or greater, adding to the leachate an adsorbent, which has an open circuit potential value between the open circuit potential value of the gold ions and that of the copper ions; and selectively adsorbing the copper ions to the adsorbent.

11 Claims, 1 Drawing Sheet

(51) Int. Cl.
  *C02F 1/28*     (2006.01)
  *C22B 7/00*     (2006.01)
  *C22B 11/08*    (2006.01)
  *C22B 3/24*     (2006.01)
  *C02F 1/00*     (2006.01)
  *C02F 1/38*     (2006.01)
  *C02F 9/00*     (2006.01)
  *C02F 1/52*     (2006.01)
  *C02F 1/76*     (2006.01)
  *C22B 11/00*    (2006.01)
  *C02F 101/10*   (2006.01)
  *C02F 101/18*   (2006.01)
  *C02F 101/20*   (2006.01)

(52) U.S. Cl.
  CPC .... *C22B 15/0076* (2013.01); *B04C 2009/002* (2013.01); *C02F 1/004* (2013.01); *C02F 1/38* (2013.01); *C02F 1/52* (2013.01); *C02F 1/76* (2013.01); *C02F 9/00* (2013.01); *C02F 2101/10* (2013.01); *C02F 2101/18* (2013.01); *C02F 2101/20* (2013.01); *C22B 15/0084* (2013.01); *Y02P 10/20* (2015.11)

(58) Field of Classification Search
  CPC .............. C02F 2101/10; C02F 2101/18; C02F 2101/20; Y02P 10/20
  USPC .................... 75/404; 210/660, 702, 756, 904
  See application file for complete search history.

(56) References Cited

FOREIGN PATENT DOCUMENTS

| | | | |
|---|---|---|---|
| JP | 2012001747 | A | 1/2012 |
| JP | 2014051737 | A | 3/2014 |
| JP | 2015166080 | A | 9/2015 |
| JP | 2017528312 | A | 9/2017 |
| KR | 20030060304 | A | 7/2003 |
| KR | 101029472 | B1 | 4/2011 |
| KR | 20130060878 | A | 6/2013 |
| KR | 20180110834 | A | 10/2018 |
| WO | WO9526418 | A1 | 10/1995 |
| WO | WO2014065487 | A1 | 5/2014 |

* cited by examiner

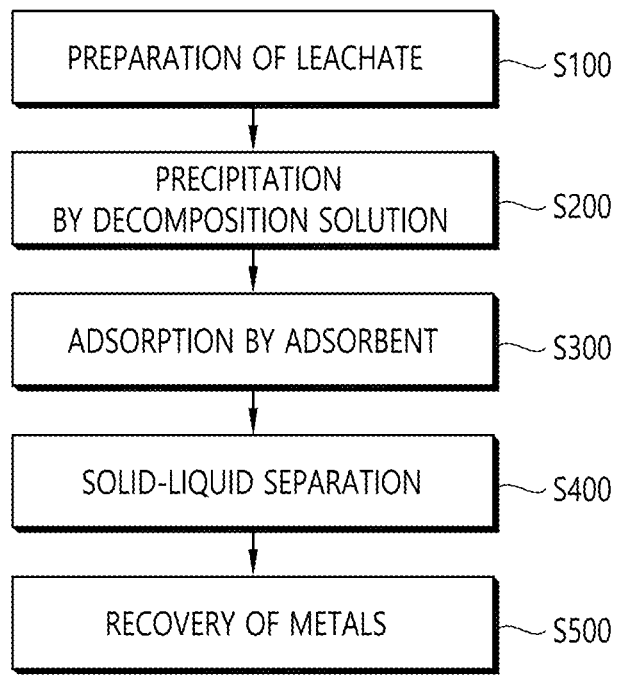

METAL RECOVERY METHOD USING ADSORBENT

TECHNICAL FIELD

The present invention relates to a metal recovery method using an adsorbent.

BACKGROUND ART

Valuable metals are generally contained in waste liquids, plating waste liquids, or washing water generated in electronic industries (e.g., semiconductor manufacturing processes, etc.). In particular, waste liquids or washing water generated in industrial processes where precious metals are used contain a considerable amount of precious metals, and thus, it is necessary to recover and recycle these precious metals.

In general, the methods for recovering precious metals contained in the waste liquid or washing water often adopt methods such as ion exchange resin method, activated carbon method, and electrowinning method, and the solutions recovered therefrom may be discarded after neutralization or used by recycling after purification process.

Among them, the electrowinning method is a method of electrolytic reduction of an aqueous solution or leachate containing precious metals as an electrolyte solution to precipitate the desired precious metals on the cathode surface. The electrowinning method has advantages in that high purity metals can be obtained at a time without undergoing an intermediate step such as crude metals, and that the solvent can be regenerated and reused in the leaching process by the electrolysis.

However, cyanide compounds are used to dissolve valuable metals such as waste PCB, and the electrowinning method has problems in that the efficiency of electrowinning is lowered by the cyanide compounds and that the recovery efficiency is lowered because various metals are mixed in the dissolved solution.

DISCLOSURE

Technical Problem

The present invention aims to solve the above-described problems, and an object of the present invention is to provide a metal recovery method using an adsorbent.

Technical Solution

The object of the present invention is achieved by a method for recovering metals, which includes preparing a leachate containing metal ions and cyanides, wherein the metal ions include gold ions and copper ions; and in a state where the leachate has a cyanide concentration of 0.1 ppm or greater, adding to the leachate an adsorbent, which has an open circuit potential value between the open circuit potential value of the gold ions and that of the copper ions; and selectively adsorbing the copper ions to the adsorbent.

The adsorbent may be added in a state where the redox potential of the gold ions, by the binding with cyanide, is lower than that of the copper ions.

The adsorbent may include magnetite.

The method may further include adding a decomposition solution capable of decomposing the cyanide to the leachate; and selectively precipitating the copper ions, wherein the adsorbent may be added after the precipitation.

The adsorbent may be added after 60% or a greater portion of the copper ions are precipitated in the leachate; and the adsorption may be performed at 60° C. or lower.

The molar ratio of the copper ions to be precipitated to the copper ions to be adsorbed may be 1:0.1 to 1:0.4.

The decomposition solution may include sodium hypochlorite.

The cyanides may include any one of KCN and NaCN.

The method may further include performing a solid-liquid separation of a filtrate and the adsorbent to which the copper ions are selectively adsorbed; and recovering the gold ions from the filtrate using a cyclone reactor.

The metal ions may further include silver ions; and 90% or greater portion of the silver ions may be precipitated by the decomposition solution.

The leachate may be obtained through leaching of waste PCB.

Advantageous Effects

According to the present invention, a method for recovering metals using an adsorbent is provided.

DESCRIPTION OF DRAWINGS

FIG. 1 is a flowchart illustrating a metal recovery method according to an embodiment of the present invention.

MODE FOR INVENTION

Hereinafter, the metal recovery method according to the present invention will be described in detail with reference to the accompanying drawings.

Hereinafter, in the present invention, "copper ions"/"gold ions" represents a state in which copper and/or gold is dissolved in a leachate, and may be expressed as "gold" and/or "copper".

FIG. 1 is a flowchart illustrating a metal recovery method according to an embodiment of the present invention.

First, a leachate including metal ions is prepared (S100). The leachate can be obtained by leaching of waste PCB, but the method is not limited to thereto.

The metal ions include gold ions and copper ions, and may include any one or more selected from silver ions, nickel ions, zinc ions, tin ions, and iron ions, in addition to gold ions and copper ions.

The concentration of metal ions in a leachate is 10-200 mg/L for gold, 0.01-0.5 mg/L for silver, 50-3,000 mg/L for copper, 1-20 mg/L for nickel, and 0.1-5 mg/L for iron, but is not limited thereto.

A leachate may contain cyanides used to dissolve precious metals, in particular gold, and these cyanides may contain at least one of KCN and NaCN.

Then, a decomposition solution capable of decomposing cyanides is added to the leachate (S200).

The decomposition solution may include sodium hypochlorite (electrolytic sodium hypochlorite), but is not limited thereto. Sodium hypochlorite can be obtained by electrolysis of brine. The cyanide compound is oxidized to cyanic acid by sodium hypochlorite and then oxidized to carbon dioxide and nitrogen.

Through this process, silver ions become silver precipitates and are separated from a leachate. In addition, a significant portion of the copper ions become copper precipitates and are separated from the leachate. In this process, silver ions may be precipitated at a rate of 80% or higher, 90% or higher, 95% or higher, or 99% or higher, and copper ions may be precipitated at a rate of 50% or higher, 60% or higher, 70% or higher, 80% or higher, or 90% or higher.

In this step, copper ions are selectively precipitated. Selective precipitation means that the precipitation rate of copper ions is at least two-fold, at least five-fold, or at least ten-fold compared to that of gold ions.

In this step, the sodium hypochlorite may be added in two or more times.

For precipitation of copper ions, the sodium hypochlorite and copper ions may be reacted for 1-50 hours, 10-30 hours, or 10-20 hours. In this step, stirring may not be performed.

This step may be omitted or the reaction time may be shortened depending on the concentration of cyanides, concentration of silver ions and/or concentration of copper ions, etc.

Next, the copper ions in the precipitate are selectively adsorbed using an adsorbent (S300).

In particular, the selective adsorption means that the adsorption rate of copper ions is 2-fold or greater, 5-fold or greater, or 10-fold or greater than that of gold ions. Alternatively, the selective adsorption means that the adsorption rate of copper ions is 80% or greater, 90% or greater, 80% to 100%, or 85% to 99%, and the adsorption rate of gold ions is below 20%, below 10%, or below 5%.

The adsorption may be performed at 75° C. or below or 60° C. or below. When the adsorption temperature is increased, the adsorption of gold ions may occur. Specifically, the adsorption may be performed at room temperature to 50° C. or room temperature to 60° C.

The adsorbent used for adsorption has an open circuit potential value between the open circuit potential value of the ions of a precious metal (gold) and the open circuit potential value of the ions of a valuable metal (copper).

The adsorbent may include magnetite.

Since magnetite has a property of a semiconductor, when magnetite is present in a solution, the electrons generated by the oxidation of the magnetite can be used for the reduction of cations that approach the surface of the magnetite. The reason why metals are adsorbed on the magnetite is because that magnetite ($Fe_3O_4$) is a mineral (FeO and $Fe_2O_3$) in which the ferrous ($Fe^{2+}$) oxides and ferric ($Fe^{3+}$) oxides coexist. When the ions of a precious metal are approached from the outside, the ferrous iron releases electrons (oxidized), resulting in a phenomenon that precious metals are reduced/adsorbed on the surface of the magnetite., and this is because the open circuit potential (OCP) of the magnetite lies between the open circuit potential (OCP) of the precious metal (gold) and the general metal (copper).

Magnetite may be added in powder form and may be stirred after it is added. Aeration may be used in the stirring process.

When the magnetite is added, the concentration of cyanides in the liquid to be recovered may be 0.1 ppm or higher, 1 ppm or higher, or 5 ppm or higher.

The present inventors have found that copper ions are selectively adsorbed to magnetite rather than gold ions when the cyanides concentration of a leachate is above a certain level. When gold ions and copper ions are bound as shown in Table 1 below, the magnitude of the redox potential is reversed. In the present invention, the adsorption using magnetite is performed in a state in which the redox potential of gold ions is lower than that of copper ions due to bonding with cyan, thereby allowing selective adsorption of copper ions.

TABLE 1

|  | Redox Potential (V) |
| --- | --- |
| $Au/Au^+$ | 1.69 |
| $Au/Au^{3+}$ | 1.50 |
| $Au/Au(Cl)_4^-$ | 1.00 |
| $Ag/Ag^+$ | 0.80 |
| $Cu/Cu^{2+}$ | 0.34 |
| $Ag/Ag(CN)_2^-$ | −0.31 |
| $Cu/Cu(CN)_2^-$ | −0.43 |
| $Au/Au(CN)_2^-$ | −0.60 |

The temperature when magnetite is added and stirred may be room temperature.

Since a significant amount of copper ions are precipitated through sodium hypochlorite, the amount of magnetite used in this step can be reduced.

Magnetite may be added after the precipitation 60% or more, 70% or more, 80% or more, and 90% or more of the copper ions in the leachate are precipitated. The molar ratio of the copper ions to be precipitated to the copper ions to be adsorbed may be 1:0.1 to 1:0.4.

The amount of the copper ions to be precipitated to that of the copper ions to be adsorbed may be adjusted in consideration of process time, the amount of sodium hypochlorite to be used, the amount of magnetite to be used, etc.

Next, through a solid-liquid separation, the magnetite to which copper ions are selectively adsorbed and a filtrate in which most gold ions remain (S400) are obtained. Gold ions may remain in the filtrate in an amount of 80% or more, 90% or more, or 95% or more.

Next, gold ions are recovered from the filtrate (S500).

The recovery of gold ions may be performed by the electrowinning method using a cyclone reactor (electrolytic bath), but the recovery method is not limited to thereto.

In the cyclone reactor, a solution containing metal ions is supplied between the cathode and the anode in the form of a vortex, thereby depositing metals on the surface of the anode. In the cyclone reactor, a voltage suitable for the reduction of the metals to be recovered must be applied. According to the present invention, since the copper ions having the highest content in the leachate have been sufficiently removed by sodium hypochlorite and an adsorbent, high-purity gold can easily be recovered from the filtrate.

Although not shown, the above method may further include separating magnetite and copper ions adsorbed thereto, which may be performed by a conventional method.

Hereinafter, the present invention will be described in detail through experimental examples.

First, a leachate was prepared. The concentration of each component in a leachate was 52.5 ppm for gold, 298.0 ppm for copper, 1.3 ppm for nickel, and 0.11 ppm for iron.

The CN concentration in the leachate was 553 ppm.

EXPERIMENT 1

Change in Cyanide (CN) Concentration with Sodium Hypochlorite

After adding a varying amount of sodium hypochlorite into 100 mL of a leachate at room temperature, the change in cyanide (CN) concentration was observed. As shown in Table 2 below, the CN concentration was rapidly decreased as the amount of sodium hypochlorite increased.

TABLE 2

| NaClO (mL) | CN Concentration (ppm) |
|---|---|
| 0 | 105 |
| 10 | 28.1 |
| 20 | 1.22 |
| 30 | 0.69 |
| 40 | 0.63 |
| 50 | 0.52 |
| 60 | 0.5 |
| 70 | 0.46 |
| 80 | 0.41 |
| 90 | 0.36 |
| 100 | 0.12 |

EXPERIMENT 2

Adsorption of Copper Ions and Told Ions by Magnetite 40 mL of sodium hypochlorite and a varying amount of magnetite were added to 100 mL of a leachate and allowed to adsorb at 80° C. for 12 hours.

The adsorption rates with the amount of magnetite are shown in Table 3 below. The adsorption rate of gold ions was very low regardless of the amount of magnetite used, and copper ions showed a high adsorption rate of 70% or higher and the adsorption rate also increased as the amount of magnetite used increased. However, even when the amount of magnetite used was increased, it was difficult to obtain the adsorption rate of copper ions at a rate of 95% or higher.

TABLE 3

| Magnetite (g) | Adsorption Rate of Cu (%) | Adsorption Rate of Au (%) |
|---|---|---|
| 3.6 | 70.91 | 0.57 |
| 7.2 | 75.27 | 0.55 |
| 10.8 | 82.46 | 0.55 |
| 14.4 | 86.53 | 0.54 |
| 18 | 88.44 | 0.52 |
| 21.6 | 91.64 | 0.50 |
| 25.2 | 93.86 | 0.49 |

EXPERIMENT 3

Precipitation of Copper Ions by Sodium Hypochlorite

The precipitation rates of the metal ions with the addition amount of sodium hypochlorite were observed. A varying amount of sodium hypochlorite was added to 100 mL of a leachate and allowed to react at room temperature for 12 hours without stirring. The results are shown in Table 4 below.

TABLE 4

| NaClO (mL) | Precipitation Rate of Au (%) | Precipitation Rate of Cu (%) |
|---|---|---|
| 10 | 0.25 | 38.27 |
| 20 | 0.26 | 66.41 |
| 30 | 0.26 | 67.37 |
| 40 | 0.26 | 71.15 |
| 50 | 0.26 | 74.94 |
| 60 | 0.26 | 78.91 |
| 70 | 0.26 | 81.41 |

TABLE 4-continued

| NaClO (mL) | Precipitation Rate of Au (%) | Precipitation Rate of Cu (%) |
|---|---|---|
| 80 | 0.26 | 83.08 |
| 90 | 0.26 | 84.55 |
| 100 | 0.26 | 87.88 |

The precipitation rate of copper ions increased as the addition amount of sodium hypochlorite increased, but the precipitation rate of gold ions remained very low regardless of the addition amount of sodium hypochlorite.

EXPERIMENT 4

Adsorption of Copper Ions and Gold Ions by Magnetite After Precipitation 10 g of magnetite was added to a filtrate of a leachate obtained using 50 mL of sodium hypochlorite in Experiment 3. The temperature was room temperature and the stirring speed was 150 rpm. The adsorption rates of copper ions and gold ions with time are shown in Table 5.

It was confirmed that more than 99% of the copper ions that were not precipitated by sodium hypochlorite were adsorbed. Compared with Experiment 2, magnetite was added in a state where about 75% of copper ions were precipitated by sodium hypochlorite, and thus, a higher adsorption rate of copper ions was obtained within a short time. On the other hand, gold ions were hardly adsorbed.

TABLE 5

| Time (Min) | Adsorption Rate of Au (%) | Adsorption Rate of Cu (%) |
|---|---|---|
| 0 | 0 | 0 |
| 30 | 0 | 99.12 |
| 60 | 0 | 99.12 |
| 120 | 0 | 99.18 |
| 240 | 0 | 99.25 |
| 480 | 0 | 99.39 |
| 1440 | 0 | 99.45 |

EXPERIMENT 5

Adsorption of Copper Ions and Gold Ions with Temperature

The adsorption rates of copper ions and gold ions were observed while changing the temperature under the same conditions as in Experiment 4. The adsorption rates after 12 hours at each temperature are shown in Table 6.

TABLE 6

| Temperature (° C.) | Adsorption Rate of Au (%) | Adsorption Rate of Cu (%) |
|---|---|---|
| 25 | 0 | 99.45 |
| 50 | 0 | 99.56 |
| 75 | 10 | 99.44 |
| 90 | 47 | 99.50 |

Copper ions showed high adsorption rates regardless of temperature. Although gold ions were hardly adsorbed up to the temperature of 50° C., the adsorption rates of gold ions increased with the increase of temperature. That is, as the temperature increases, selective adsorption of copper ions becomes difficult.

Although the present invention has been described with reference to the embodiments illustrated in the accompanying drawings, these embodiments are merely exemplary, and it will be understood by those skilled in the art that other embodiments with various modifications and equivalents thereof are possible. Accordingly, the true protective scope of the present invention should be defined only by the appended claims.

The invention claimed is:

1. A method for recovering metals using an adsorbent, comprising:
   preparing a leachate comprising metal ions and cyanides, wherein the metal ions comprise gold ions and copper ions; and
   in a state where the leachate has a cyanide (CN) concentration of 0.1 ppm or greater, adding to the leachate an adsorbent, which has an open circuit potential value between the open circuit potential value of the gold ions and that of the copper ions; and selectively adsorbing the copper ions to the adsorbent.

2. The method of claim 1, wherein the adsorbent is added in a state where the redox potential of the gold ions, by binding with CN, is lower than that of the copper ions.

3. The method of claim 2, wherein the adsorbent comprises magnetite.

4. The method of claim 3, wherein the method further comprises adding a decomposition solution capable of decomposing the cyanides to the leachate; and selectively precipitating the copper ions, wherein the adsorbent is added after the precipitation.

5. The method of claim 4, wherein the adsorbent is added after 60% or a greater portion of the copper ions are precipitated in the leachate; and the adsorption is performed at 60° C. or lower.

6. The method of claim 5, wherein the molar ratio of the copper ions to be precipitated to the copper ions to be adsorbed is 1:0.1 to 1:0.4.

7. The method of claim 4, wherein the decomposition solution comprises sodium hypochlorite.

8. The method of claim 4, wherein the cyanides comprise any one of KCN and NaCN.

9. The method of claim 4, wherein the method further comprises:
   performing a solid-liquid separation of a filtrate and the adsorbent to which the copper ions are selectively adsorbed; and
   recovering the gold ions from the filtrate using a cyclone reactor.

10. The method of claim 4, wherein the metal ions further comprise silver ions; and 90% or a greater portion of the silver ions are precipitated by the decomposition solution.

11. The method of claim 4, wherein the leachate is obtained through leaching of waste PCB.

* * * * *